(12) United States Patent
Zhu et al.

(10) Patent No.: US 10,458,329 B2
(45) Date of Patent: Oct. 29, 2019

(54) SYSTEM AND PROCESS FOR RECOVERING POWER AND STEAM FROM REGENERATOR FLUE GAS

(71) Applicant: UOP LLC, Des Plaines, IL (US)

(72) Inventors: Xin X. Zhu, Long Grove, IL (US); Joao Jorge da Silva Ferreira Alves, Arlington Heights, IL (US); Paolo Palmas, Des Plaines, IL (US); Richard A. Johnson, II, Algonquin, IL (US); Michael R. Van de Cotte, Palatine, IL (US)

(73) Assignee: UOP LLC, Arlington Heights, IL (US)

( * ) Notice: Subject to any disclaimer, the term of this patent is extended or adjusted under 35 U.S.C. 154(b) by 718 days.

(21) Appl. No.: 14/199,197

(22) Filed: Mar. 6, 2014

(65) Prior Publication Data
US 2015/0252725 A1 Sep. 10, 2015

(51) Int. Cl.
*F02C 3/20* (2006.01)
*F01K 5/02* (2006.01)

(52) U.S. Cl.
CPC .............. *F02C 3/205* (2013.01); *F01K 5/02* (2013.01); *Y02E 50/12* (2013.01)

(58) Field of Classification Search
CPC .... F02C 3/205; F02C 3/22; F02C 3/26; F02C 3/28
USPC .......................... 60/39.464, 39.465, 780, 781
See application file for complete search history.

(56) References Cited

U.S. PATENT DOCUMENTS

| | | | |
|---|---|---|---|
| 4,139,441 A | 2/1979 | Bose | |
| 4,284,015 A * | 8/1981 | Dickinson | F23C 6/04 110/218 |
| 4,307,568 A * | 12/1981 | Huller | F02C 7/08 60/39.511 |

(Continued)

FOREIGN PATENT DOCUMENTS

| | | |
|---|---|---|
| EP | 888165 A1 | 9/1997 |
| GB | 2197390 A | 5/1988 |

(Continued)

OTHER PUBLICATIONS

Chen, A. "Energy conservation of the flue gas expander of FCCU (FCC unit)", Petroleum Processing and Petrochemicals (1996), 27(11), 56-60.

(Continued)

*Primary Examiner* — Sarang Afzali
*Assistant Examiner* — Darrell C Ford
(74) *Attorney, Agent, or Firm* — Paschall & Maas Law Office, LLC; James C. Paschall

(57) ABSTRACT

A power generation process for use in a processing unit that includes the steps of: using a regenerator to produce a flue gas stream; removing catalyst particles from the flue gas stream; routing the flue gas stream to a combustor/expander unit after performing the step of removing catalyst particles; and using rotation of the turbine of the combustor/expander unit as a source of rotary power. Preferably, the combustor/expander unit includes a combustion chamber and a power recovery turbine housed within a single casing. In certain embodiments, the flue gas stream is routed between the regenerator and the combustor/expander without passing through a compressor.

17 Claims, 2 Drawing Sheets

(56) References Cited

U.S. PATENT DOCUMENTS

| | | | |
|---|---|---|---|
| 4,714,032 A * | 12/1987 | Dickinson | C02F 11/086 110/238 |
| 4,755,282 A | 7/1988 | Samish et al. | |
| 5,050,375 A * | 9/1991 | Dickinson | C02F 11/086 110/238 |
| 5,106,799 A * | 4/1992 | Green | B01J 8/28 208/164 |
| 5,114,682 A | 5/1992 | Goelzer | |
| 5,308,586 A | 5/1994 | Fritsche et al. | |
| 5,469,698 A | 11/1995 | Garcia-Mallol | |
| 5,490,377 A * | 2/1996 | Janes | F01D 1/00 60/39.12 |
| 5,624,964 A * | 4/1997 | Cimini | C01B 3/44 518/702 |
| 5,938,818 A | 8/1999 | Miller | |
| 6,314,715 B1 * | 11/2001 | Stats | F02C 3/28 60/39.12 |
| 6,482,373 B1 | 11/2002 | Hannaford et al. | |
| 6,544,317 B2 | 4/2003 | Miller | |
| 7,404,891 B2 | 7/2008 | van Egmond et al. | |
| 7,470,412 B2 | 12/2008 | Rosen et al. | |
| 7,682,576 B2 | 3/2010 | Zhu et al. | |
| 7,727,380 B2 | 6/2010 | Couch et al. | |
| 7,802,435 B2 * | 9/2010 | McGehee | C10G 11/182 60/39.182 |
| 7,959,892 B2 | 6/2011 | Wu et al. | |
| 8,187,364 B2 | 5/2012 | Jepsen et al. | |
| 9,581,082 B2 * | 2/2017 | Allam | F02C 3/20 |
| 2003/0101728 A1 * | 6/2003 | Wakana | F02C 6/14 60/727 |
| 2004/0040312 A1 * | 3/2004 | Hoffjann | B01D 53/02 60/784 |
| 2004/0074391 A1 * | 4/2004 | Durante | B01D 53/64 95/285 |
| 2005/0126171 A1 * | 6/2005 | Lasker | F02C 1/04 60/645 |
| 2005/0144844 A1 * | 7/2005 | Miyoshi | C10J 3/482 48/102 R |
| 2005/0238548 A1 * | 10/2005 | van Egmond | C10G 9/00 422/146 |
| 2006/0096455 A1 * | 5/2006 | Couch | B01D 45/16 95/269 |
| 2007/0034550 A1 | 2/2007 | Hedrick et al. | |
| 2009/0284013 A1 * | 11/2009 | Anand | B01D 53/8625 290/52 |
| 2009/0314190 A1 * | 12/2009 | Wu | B01D 53/62 110/345 |
| 2010/0003553 A1 * | 1/2010 | Pfefferle | C10J 3/00 429/415 |
| 2011/0201699 A1 * | 8/2011 | Lucas | C07C 29/1518 518/702 |
| 2011/0269620 A1 * | 11/2011 | Myers | B01J 29/80 502/38 |
| 2017/0074163 A1 * | 3/2017 | Ikeda | C01B 3/26 |

FOREIGN PATENT DOCUMENTS

| | | |
|---|---|---|
| JP | 2000146116 A2 | 5/2000 |
| WO | WO1993/014308 A1 | 7/1993 |
| WO | WO 97/33678 | 9/1997 |
| WO | WO 2012/074942 A2 | 6/2012 |

OTHER PUBLICATIONS

Sun Petroleum Products Co. "FCC power recovery saves $18 million at refinery," Oil & Gas Journal (1979), PennWell Publishing, 77(47), pp. 164, 166,168.

Dziewulski et al. "Recover power from FCC units," Hydrocarbon Processing (1978), 57(12), 131-135.

Hissink et al. "Comparison of four different systems shows best FCC power recovery option," Technology—Gas & Oil Journal (1984), 82(38), 109-112, 117.

Dziewulski, T.A. "Tune up your FCCU expander," Hydrocarbon Processing (1994), 73(8), 144-146.

Fritsche, G.R., "Electrostatic separator removes FCC catalyst fines from decanted oil," The Oil and Gas Journal (1977), 75(13), 73-76, 81.

Gentry et al., "Heavy Oil Processing," National Petrochemical and Refiners Association—Q & A Session on Refining and Petrochemical Technology (2000), 89. 91-132.

Bingcheng, Cao, "Research Progress in Purification of FCC Slurry Oil and Its Application to Chemical Industry," Petrochemical Technology (2012), 41(3), 364-369.

Fritsche et al., "Electrostatic catalyst separator upgrades FCC bottoms," Oil and Gas Journal (1980), 78(40), 55-59.

* cited by examiner

SYSTEM AND PROCESS FOR RECOVERING POWER AND STEAM FROM REGENERATOR FLUE GAS

The present invention relates generally to a power generation process for use in a processing unit, such as a fluid catalytic cracking (FCC) unit, and more particularly to a process for generating power from regenerator flue gas that includes a combustor/expander unit formed of a combustion chamber and a power recovery turbine housed within a single casing. Preferably, the process also includes components for recovering steam from the flue gas.

BACKGROUND OF THE INVENTION

Flue gas from the regenerator of a fluid catalytic cracking (FCC) unit can be used for steam generation in a Flue Gas Cooler (FGC). Alternatively, the flue gas can be used to make power in an expander, and then to generate steam in the FGC. Traditional FCC power recovery technologies are limited with regard to the amount of power recovery because the inlet temperature of the expander is constrained by the maximum temperature of the flue gas exiting the regenerator.

BRIEF SUMMARY OF THE INVENTION

In embodiments of the present invention, a novel process flow scheme is utilized for power recovery and steam generation in a processing unit, such as an FCC unit. Although the examples provided will focus on an FCC unit, the present process can be utilized in other types of processing units, such as in a methanol to olefins (MTO) processing unit and in a biomass conversion processing unit.

One of the objectives of certain embodiments of the present invention is to increase both power and steam generation via increased flue gas temperature and flow rate. To achieve this, an auxiliary fuel combustion chamber is placed in front of the flue gas expander in which the flue gas from the regenerator is burnt together with supplemental fuel (as needed) and a source of oxygen, such as air.

As mentioned above, traditional FCC power recovery technologies are limited with regard to the amount of power recovery because the turbine inlet temperature is constrained by the maximum temperature allowed by the regenerator. In the present invention, this limit is overcome by adding a combustor in front of the expander.

Power recovery is usually more valuable than heat recovery, as it can drive other rotating equipment (such as the main air blower) or a generator for electricity production. Although this invention aims to increase power recovery, steam generation can be increased as well due to increased heat content in the flue gas via increased flue temperature and flow rate.

More specifically, the present invention provides a power generation process for use in a processing unit that includes the steps of: using a regenerator to produce a flue gas stream; removing catalyst particles from the flue gas stream; routing the flue gas stream to a combustor/expander unit after performing the step of removing catalyst particles; and using rotation of the turbine of the combustor/expander unit as a source of rotary power. Preferably, the combustor/expander unit includes a combustion chamber and a power recovery turbine housed within a single casing, although separate units are also contemplated. In certain embodiments, the flue gas stream is routed between the regenerator and the combustor/expander unit without passing through a compressor.

The present invention also provides a power generation process for use in a processing unit, including the steps of: using a regenerator to produce a flue gas stream; routing the flue gas stream to a first steam generator; removing catalyst particles from the flue gas stream after the flue gas stream has been routed to the first steam generator; routing the flue gas stream to a combustor/expander unit after performing the step of removing catalyst particles; and using rotation of the turbine of the combustor/expander unit as a source of rotary power. Once again, preferably, the combustor/expander unit comprises a combustion chamber and a power recovery turbine housed within a single casing, although separate units are also contemplated, and the flue gas is preferably routed between the regenerator and the combustor/expander unit without passing through a compressor. In some embodiments, the present invention could allow for standardization of a combustor/expander and associated equipment to improve the return on investment, as opposed to maximizing power generation.

BRIEF DESCRIPTION OF THE SEVERAL VIEWS OF THE DRAWINGS

Preferred embodiments of the present invention are described herein with reference to the drawings wherein.

DETAILED DESCRIPTION OF THE INVENTION

Figure 1:
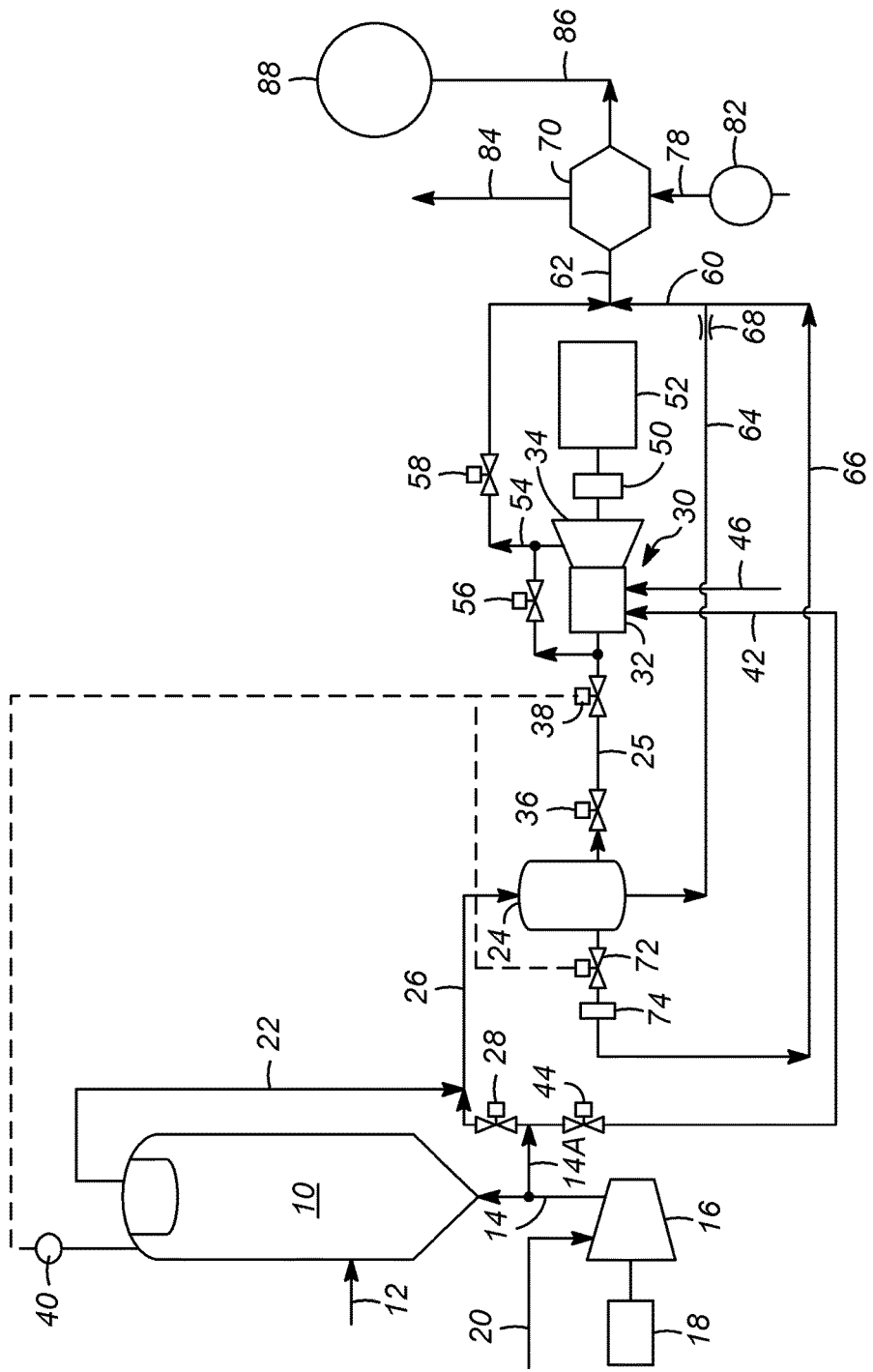
FIG. 1 is a process flow diagram of an embodiment of the present power generation process.

FIG. 1 is the process flow diagram of one example of an embodiment of the present process for generating power in a processing unit. Although this example is an FCC unit, the present power generation process of this embodiment, and other embodiments described herein, can be used in other types of processing units, such as such as in methanol to olefins (MTO) processing units and in biomass conversion processing units.

In this example of the process, a regenerator 10, which is used to oxidize coke from a catalyst, receives a catalyst stream 12 from a reactor (such as an FCC reactor that cracks a hydrocarbon feed into simpler molecules through contact with a catalyst). The regenerator 10 also receives a stream 14 of air which has passed through a blower 16 powered by a motor 18. The blower 16 is fed by a filtered air stream 20.

Flue gas stream 22 exits the regenerator, and is routed to a filtering unit 24. The input stream to the filtering unit 24 is preferably a combined stream 26 that also includes air from stream 14A, in the necessary amount, as regulated by restriction orifice 28. In the alternative, air from stream 14A could be added immediately downstream of the filtering unit 24, along with the necessary valving and controls. The filtering unit 24 can be any desired type of filtration unit capable of removing catalyst particles from the stream 26. For example, the filtering unit 26 can include both electrostatic precipitators and one or more additional filters, such as ceramic filters, whereby the catalyst particles are removed by passing the stream through the electrostatic precipitators following by filtration with the ceramic filter(s). Alternatively, it is contemplated that a third stage separator or a multiple stage separator could be used as the filtering unit 24, as long as it provides sufficient filtration to avoid damage to the turbine.

After the flue gas stream has passed through the filtering unit 24 to have the catalyst particles removed, now designated as stream 25, it is routed to a combustor/expander unit 30. The combustor/expander unit 30 includes a combustion chamber 32 and a power recovery turbine 34 that are both housed within the single casing of the combustor/expander unit 30. A variety of combustion chamber designs can be used, such as a multi-staged combustion facility (in which a partial burn occurs in a pre-mixing chamber and full combustion occurs in a second chamber), which has the added benefit of reducing $NO_x$ emissions. The flow of stream 25 is preferably controlled and regulated by valving, such as an isolation valve 36 and a throttling valve 38. The throttling valve 38 is controlled by a pressure indicating controller (PIC) 40, which is associated with the regenerator 10. Any flow that cannot be routed via stream 25 to the combustor/expander unit 30 is routed through a bypass stream 66, which is also controlled by PIC 40 via valve 72.

When the operating temperature of the power recovery turbine 34 is increased by combustion within the combustion chamber 32, any catalyst particles remaining within the stream become soft, and thus could stick to the turbine blades and/or the expander casing, which deteriorates the turbine performance. Removal of particles may allow the power recovery turbine to have multiple stages of expansion, instead of just a single stage. This will improve the efficiency of the power recovery turbine 34. An additional benefit is that cleaner flue gas will result, which will satisfy stricter emission regulations. Alternatively, a different style separator can be used as the filtering unit 24, if a sufficient amount of catalyst particles can be removed to minimize damage and wear upon the components downstream and/or if the downstream components (especially turbine 34) can be of a robust enough design to withstand the conditions of the stream 25.

The combustion chamber 32 of the combustor/expander unit 30 is configured to receive compressed air through stream 42, which can be traced back to streams 14 and 14A from the main air blower 16, after being routed through a restriction orifice 44. This stream 42 of compressed air to the combustion chamber 32 provides the oxygen used for combustion. Of course, other sources of compressed air or an oxygen supply are also contemplated (such as receiving compressed air from an intermediate stage of the main air blower 16, or from a dedicated compressor that is preferably powered by the shaft of turbine 34).

The primary fuel for the combustion chamber 32 is the carbon monoxide (CO) within stream 25. In a partial burn FCC unit, the flue gas contains carbon monoxide (CO), typically up to about 10%, and more specifically between about 2% to about 5%, which is used as the primary fuel source in the combustion chamber 32. However, a supplementary fuel provided through stream 46, plus air provided through stream 42, are used mainly to combust the CO to $CO_2$, as well as to adjust the steam generation in the flue gas cooler (FGC) 70 described hereinbelow. By controlling the excess air and ensuring complete combustion of the flue gas, the result is excess oxygen, which may promote the formation of a layer of protective (and stable) chromium oxide and nickel oxide to protect the base materials in the combustor/expander unit 30 from corrosion, as opposed to an unstable sulfide scale, which would otherwise result from incomplete combustion. A variety of fuels can be used as the supplementary fuel passing through stream 46, such as natural gas, FCC dry gas after treatment, compressed pressure swing adsorption (PSA) tail gas and refinery fuel gas, as well as liquefied petroleum gas (LPG).

The combustion chamber 32 is placed in front of the power recovery turbine 34 in order to increase the turbine inlet temperature from the typical range of between approximately 1200° F. (650° C.) and approximately 1400° F. (200° C.), for example, to a new range of between approximately 1600° F. (870° C.) and approximately 2500° F. (1370° C.), for example. As can be seen in FIG. 1, the flue gas stream (i.e., streams 22, 26, and 25) is routed between the regenerator 10 and the combustor expander unit 30 without passing through a compressor.

The shaft of the turbine 34 in this embodiment is connected to gearing 50 which is in turn connected to a generator 52 that is used to generate electricity for use within the processing unit or at another location. Alternately, a high speed motor could be directly connected to the output shaft of the turbine 34, eliminating gearbox losses. In the alternative, instead of generating electricity, the power of the rotating shaft of the turbine 34 could be used for other purposes, such as for powering one or more of any of the following components, or others: a main air blower (such as blower 16), a combustor air compressor, a supplemental air compressor to serve the regenerator 10, a motor, etc. Additionally, a stream turbine may be included with the equipment train to further augment power generation.

The increases in the turbine inlet temperature and the flow-rate of the present process results in increased shaftwork generation by the turbine 34. The turbine exhaust through stream 54 is also hotter due to the hotter inlet temperature to the turbine, and such hotter exhaust will increase the steam generation in the FGC (Flue Gas Cooler) 70. Therefore, an FGC combustion chamber is not needed. The turbine exhaust stream 54 can be supplemented with gas from stream 25, as controlled by synchronization valve 56, and it can be isolated by isolation valve 58.

As can be seen in FIG. 1, in this embodiment, the combined stream 62 entering the FGC 70 includes the turbine exhaust stream 54 as well as another combined stream 60, formed by streams 64 and 66. Stream 64 is a filter underflow stream from the filtering unit 24, which can be a different style separator, and which stream 64 is regulated by critical flow nozzle 68. Stream 66 is another output stream from the filtering unit 24 that functions as a bypass of the combustor/expander unit 30, when required. The stream 66 is regulated and controlled by the valve 72 and an orifice chamber 74. As mentioned above, the valve 72 is controlled by PIC 40.

The FGC 70 also receives input stream 78, which is a boiler feed water stream that may optionally be routed through a boiler feed water pre-heater exchanger 82. The FGC 70 generates a high pressure steam stream 84, as well as output stream 86, which is routed to an optional wet gas scrubber 88, or to other components, for further cooling and cleaning Turning now to FIG. 2, an example of how to apply some of the concepts of the present description to an FCC regenerator flue gas system that contains a cold flow power recovery system (whereas the FIG. 1 embodiment related to a hot flow power recovery system). Many of the components of the FIG. 2 embodiment are similar, or the same, as those of the FIG. 1 embodiment, and such components are designated with the same reference numbers in both figures and need not be discussed again in detail.

Figure 2:
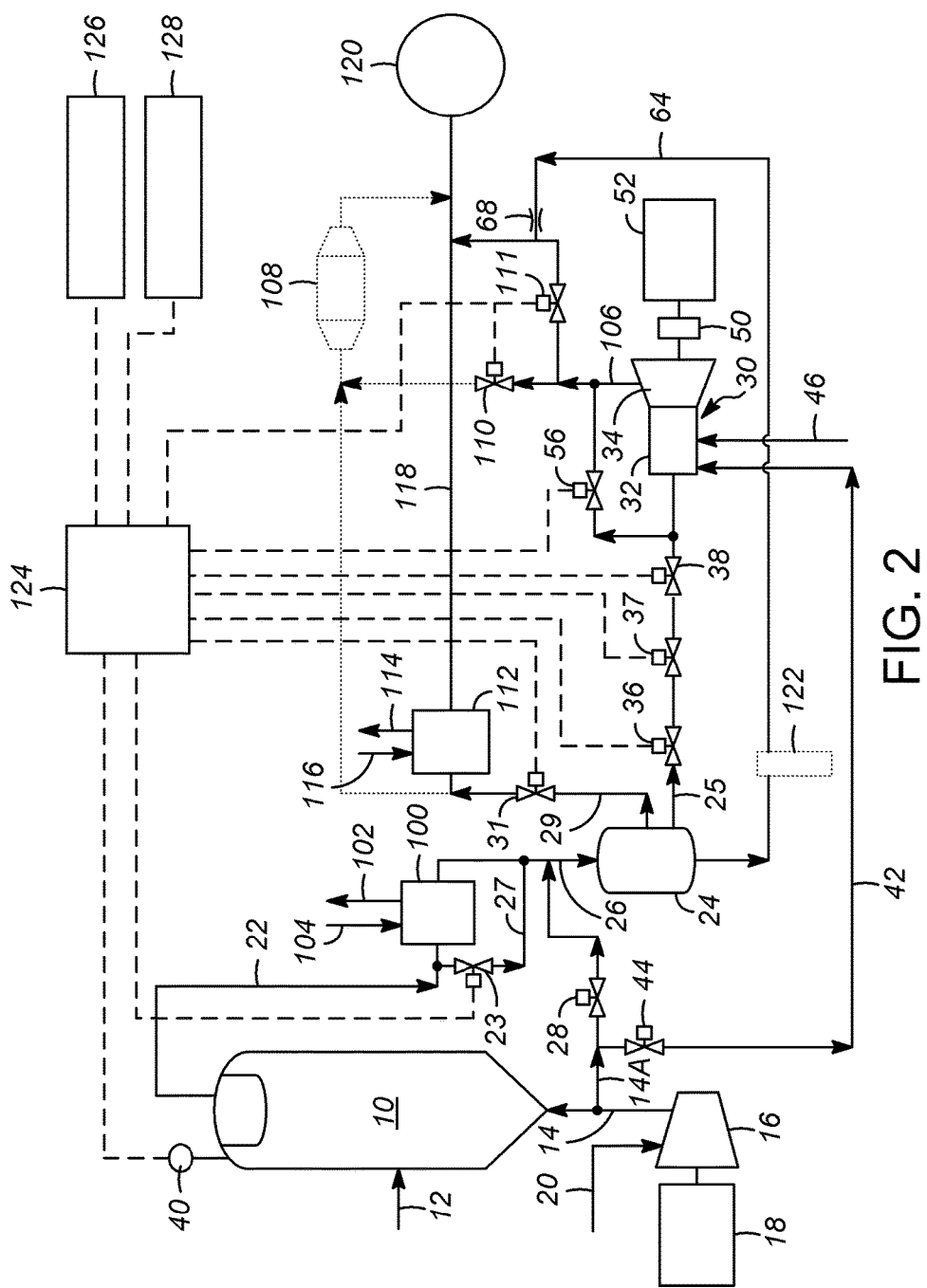
FIG. 2 is a process flow diagram of a variation on the present power generation process.

One of the differences between the embodiment of FIG. 2 and that of FIG. 1 is that in FIG. 2, the high temperature flue gas of stream 22 can be directly transmitted to a steam generator 100 to produce a stream 102 of high pressure steam (at for example, between 450 and 800 psig (3.1 to 5.52 MPa), or, more precisely between 550 and 650 psig (3.79 to 4.5 MPa)) based on an input stream 104 of boiler feed water. Alternatively, depending on the conditions, the steam generator 100 can be bypassed by routing the flue gas stream 22 through the conduit of stream 27, as controlled by modulating control valve 23. In the FIG. 2 example of this system, the temperature (or available kinetic energy) of the flue gas stream 22 is significantly reduced across the steam generator 100. For example, passing the stream through the steam generator 100 can result in a drop of the flue gas temperature stream 22 of approximately 700° F. (370° C.) to 800° F. (425° C.), which would place the temperature of the stream 26 and stream 25 that enters the combustor/expander unit 30 at approximately between 600° F. (315° C.) and 700° F. (370° C.), which would significantly decrease the power generation. However, in the present process, by installing the combustion chamber 32 directly in front of the expander 34, and preferably within the same casing, the flue gas temperature can be increased to a new range of between approximately 1600° F. (870° C.) and approximately 2500° F. (1370° C.). Increasing the flue gas temperature and the flow rate will increase power generation significantly. At the same time, the hotter exhaust gas of stream 106 from the expander 34 can be used to make more steam within an optional high pressure and low pressure steam generator 108, where stream 106 is controlled by valve 110 to enter generator 108, or it can be controlled by valve 111 to be routed to the stack 120.

The FIG. 2 embodiment also includes another steam generator in the form of low pressure steam generator 112, which produces a low pressure steam stream 114 from a boiler feed water input stream 116 by utilizing the energy from stream 29 from the filtering unit 24, as controlled by bypass valve 31. The effluent stream 118 from the lower pressure steam generator can be routed to the stack 120, or used in further processes, as desired. Another optional component of this embodiment is a fourth stage separation system 122, which can optionally be placed along stream 64, downstream of the filtering unit 24. Finally, the FIG. 2 embodiment may also include additional valving to control stream 25.

The control system of the FIG. 2 embodiment will be briefly explained next. The main processing of such control is handled by a power recovery control system 124, which is a processor that is used to determine the opening and closing of the various valves 23, 31, 36, 37, 38, 56, 110, and 111 of the system based on a variety of inputs, such as signals from the pressure recording controller 40, a pressure signal 126 from the refinery's high pressure steam header, and a power meter signal 128 from the refinery's electrical substation.

The process and components described above, including the combination of the filtration system and a combustion chamber placed directly in front of the turbine, and preferably with the same casing, represents a combination of equipment that can provide increased steam and power regeneration.

While several exemplary embodiments have been presented in the foregoing detailed description of the invention, it should be appreciated that a vast number of variations exist. It should also be appreciated that the exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It is understood that various changes may be made in the function and arrangement of elements described in an exemplary embodiment without departing from the scope of the invention as set forth in the appended claims.

The invention claimed is:

1. A power generation process for use in a processing unit, the process comprising:
   using a regenerator to produce a flue gas stream, wherein the flue gas
   stream exits from an upper portion of the regenerator;
   routing the flue gas stream to a filtering unit;
   removing catalyst particles from the flue gas stream;
   routing the flue gas stream to a combustor/expander unit after performing the step of removing catalyst particles, wherein the combustor/expander unit comprises a combustion chamber and a power recovery turbine housed within a single casing, the flue gas stream is routed between the regenerator and the combustor/expander unit without passing through a compressor, and the combustion chamber of the combustor/expander unit heats the flue gas stream to between approximately 1600° F. and approximately 2500° F.; and
   using rotation of the turbine of the combustor/expander unit as a source of rotary power.

2. The process according to claim 1, wherein the flue gas stream from the regenerator is combined with a stream from a blower upstream of the step of removing catalyst particles.

3. The process according to claim 1, wherein the rotary power is used to power at least one of the following components selected from the group consisting of: a main air blower, a combustor air compressor, a supplemental air compressor to serve the regenerator, and a motor.

4. The process according to claim 1, wherein the rotary power is used to power a generator to generate electricity.

5. The process according to claim 1, wherein the step of removing catalyst particles is performed by a passing the stream through electrostatic precipitators followed by filtration with one or more ceramic filters.

6. The process according to claim 1, wherein the processing unit in which the power generation process is performed is a fluid catalytic cracking unit, and further wherein the regenerator receives a catalyst stream from a fluid catalytic cracking reactor and the regenerator is configured and arranged to oxidize coke from catalyst within the catalyst stream.

7. A power generation process for use in a fluid catalytic cracking unit, the process comprising:
   using a regenerator to produce a flue gas stream, wherein the flue gas stream exits from an upper portion of the regenerator;
   routing the flue gas stream to a filtering unit;
   removing catalyst particles from the flue gas stream, wherein said step of removing catalyst particles utilizes the filtering unit;
   routing the flue gas stream to a combustor/expander unit after performing the step of removing catalyst particles, wherein the combustor/expander unit comprises a combustion chamber and a power recovery turbine housed within a single casing,
   wherein the combustion chamber heats the flue gas stream to between approximately 2100° F. and approximately 2500° F.;
   using carbon monoxide within the flue gas stream as a primary fuel for combustion within the combustion chamber;
   supplying supplemental fuel and air to the combustor chamber in an amount to combust carbon monoxide to carbon dioxide with an excess of oxygen; and using rotation of the power recovery turbine as a source of rotary power.

8. The process according to claim 7, wherein the supplemental fuel includes one or more fuels selected from the group consisting of the following: natural gas, fluid catalytic cracking dry gas after treatment, compressed pressure swing adsorption tail gas, refinery fuel gas and liquid diesel fuel.

9. A power generation process for use in a processing unit, the process comprising:
using a regenerator to produce a flue gas stream, wherein the flue gas stream exits from an upper portion of the regenerator;
routing the flue gas stream to a first steam generator;
removing catalyst particles from the flue gas stream after the flue gas stream has been routed to the first steam generator;
routing the flue gas stream to a combustor/expander unit after performing the step of removing catalyst particles, wherein the combustor/expander unit comprises a combustion chamber and a power recovery turbine housed within a single casing, the flue gas stream is routed between the regenerator and the combustor/expander unit without passing through a compressor, and the combustion chamber of the combustor/expander unit heats the flue gas to between approximately 1600° F. and approximately 2500° F.; and
using rotation of the turbine of the combustor/expander unit as a source of rotary power.

10. The power generation process according to claim 9, further comprising using the first steam generator to generate high pressure steam.

11. The power generation process according to claim 10, further comprising routing the flue gas stream to a second steam generator after performing the step of removing catalyst particles.

12. The power generation process according to claim 11, further comprising using the second steam generator to generate low pressure steam.

13. The power generation process according to claim 12, wherein the step of removing catalyst particles is performed by passing the stream through a filter unit including an electrostatic precipitator in series with one or more filters.

14. The power generation process according to claim 13, further comprising routing a bottoms stream from the filter unit to a separator.

15. The process according to claim 9, further comprising:
using carbon monoxide within the flue gas stream as a primary fuel for combustion within the combustion chamber; and
supplying supplemental fuel, and air, to the combustor/expansion unit.

16. The process according to claim 15, wherein the supplemental fuel includes one or more fuels selected from the group consisting of the following: natural gas, fluid catalytic cracking dry gas, compressed pressure swing adsorption tail gas, refinery fuel gas and liquid diesel fuel.

17. The process according to claim 15, wherein the rotary power is used to power a generator to generate electricity.

* * * * *